Dec. 13, 1932.  J. C. MARTIN, JR  1,890,524
PLUG COCK AND MEANS FOR TURNING SAME
Original Filed April 19, 1924   3 Sheets-Sheet 2

Inventor
J. C. Martin Jr.
By Brown & Phelps
Attorneys

Dec. 13, 1932.  J. C. MARTIN, JR  1,890,524
PLUG COCK AND MEANS FOR TURNING SAME
Original Filed April 19, 1924   3 Sheets-Sheet 3

Inventor
J. C. Martin Jr.

By Brown & Phelps
Attorneys

Patented Dec. 13, 1932

1,890,524

UNITED STATES PATENT OFFICE

JESSE C. MARTIN, JR., OF SAN FRANCISCO, CALIFORNIA, ASSIGNOR TO WALWORTH PATENTS INC., OF BOSTON, MASSACHUSETTS, A CORPORATION OF MASSACHUSETTS

PLUG COCK AND MEANS FOR TURNING SAME

Application filed April 19, 1924, Serial No. 707,668. Renewed April 11, 1927.

The invention relates to valves, and has as an object the provision of a screw operated cam movement for turning the plug of a plug valve whereby it is possible to use a valve of the type shown in valves of comparatively large dimensions.

The hereinafter described invention relates to that class of pipe closures in which a plug jointed in a plug seat is moved to open or close the fluid flow therethrough.

Among the objects of the invention is the provision of means whereby the plug is turned by the movement of a screw, the axis of which is substantially in line with the axis of the plug, without disengaging or separating the plug from its seat as normally held in tight engagement, thereby rendering possible the free movement of the plug regardless of the area of the frictionally engaging surfaces of the plug and seat, so that plug cocks of large size can be freely opened and closed and the use of this type of pipe closure extended into broader fields not now possible.

A further object of the invention is the simplified form of construction in which the turning movement of the plug is accomplished by causing a nut, traveling by the operation of a screw or spindle, to move in a predetermined path.

Another object of the invention is to provide a construction in which the plug is turned in the plug seat by a nut traveling in the path or plane of a true spiral, which path has been found to be well adapted mechanically in imparting the turning movement.

A further object is to provide the plug with a slotted stem within which a nut is caused to travel by operation of a threaded spindle coacting therewith, and to guide the movement of the nut in a bonnet or yoke fixed to or bearing against the body of the cock, in which there is a spiral path so that as the spindle is moved preferably by a wheel at the top of the bonnet the nut travels in the plane of the spiral and the plug is consequently turned in the seat to open, close or regulate the fluid flow through the cock as desired.

Another object contemplates a construction in which the small tapered end of the plug is nearest the plug moving mechanism, the plug being seated by a resilient washer or member, and provided with a packing stuffing box and gland at its small end, whereby it is possible, should occasion demand, through neglect in service forming a corrosion seal between plug and seat, to compress the gland to ease the plug in the seat.

Another object also contemplates means for lubricating the plug and plug seat surfaces in this form of plug turning mechanism.

Further objects of the invention will appear from the accompanying drawings, in which Figure 1 is a side elevation, partly in section.

As shown, the valve comprises a body 10, having flanges 11 and 12 for connection of flanged pipes in the well known manner.

Figure 1:
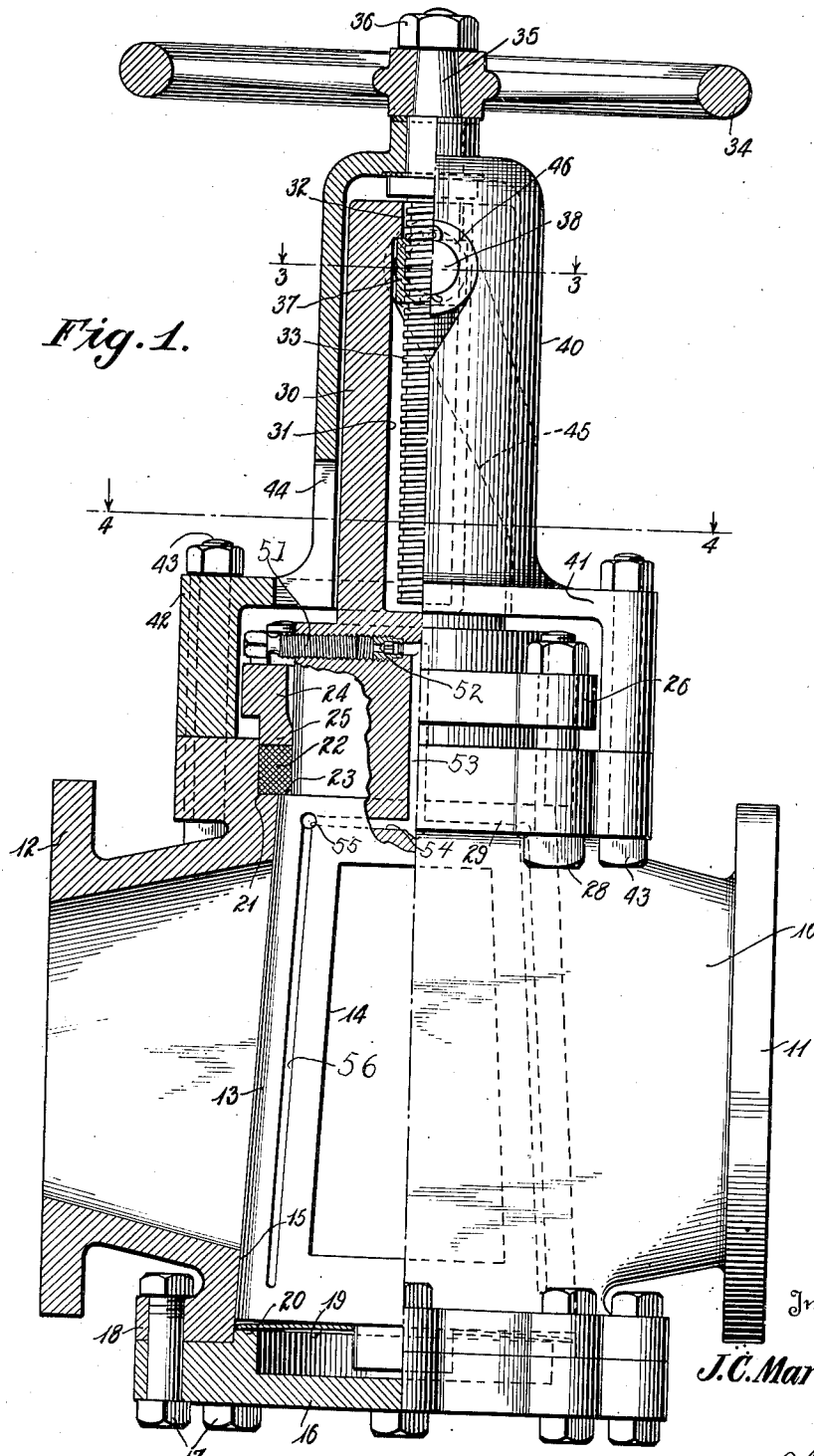
Figures 2, 3:
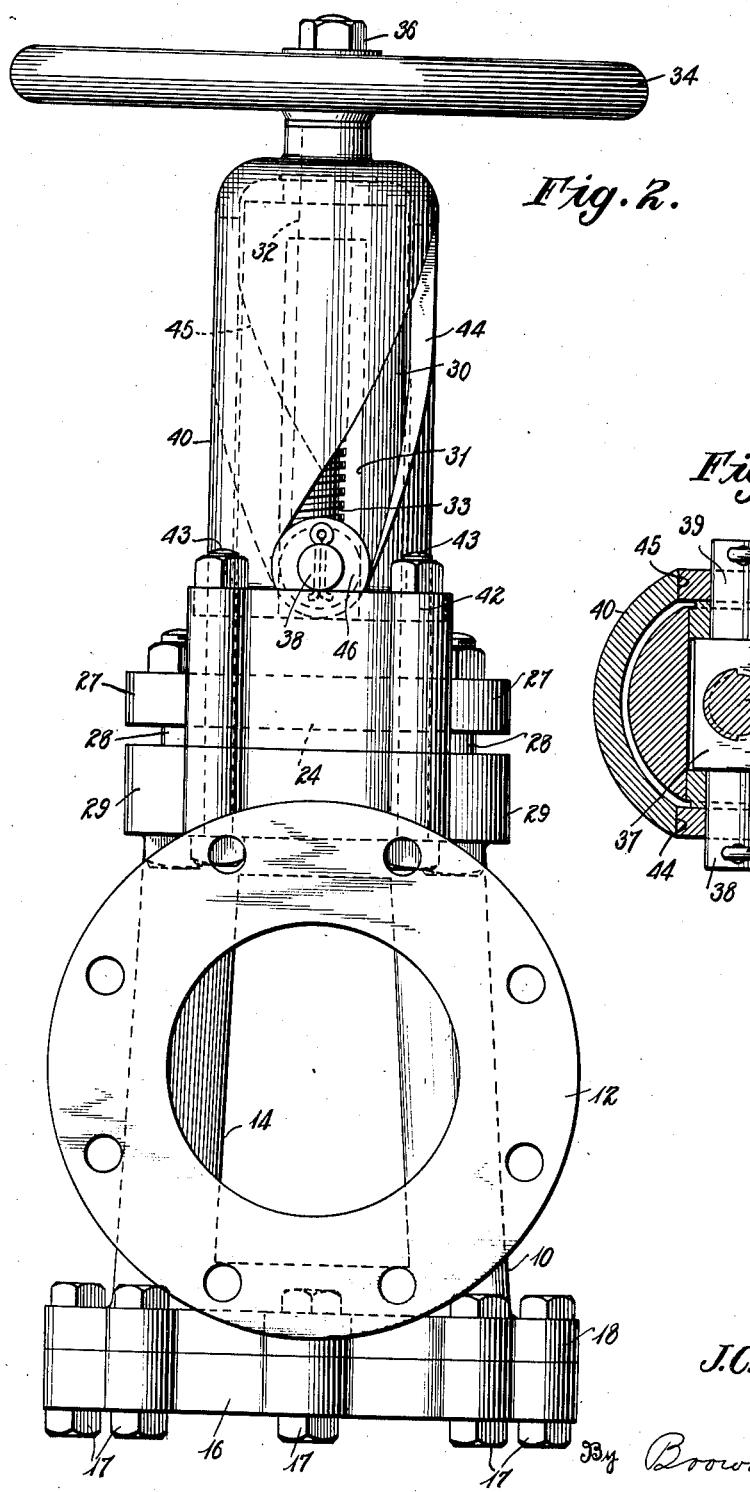
Figure 2 is an end elevation.
Figure 3 is a horizontal section on line 3, 3 of Fig. 1.
Figure 4:
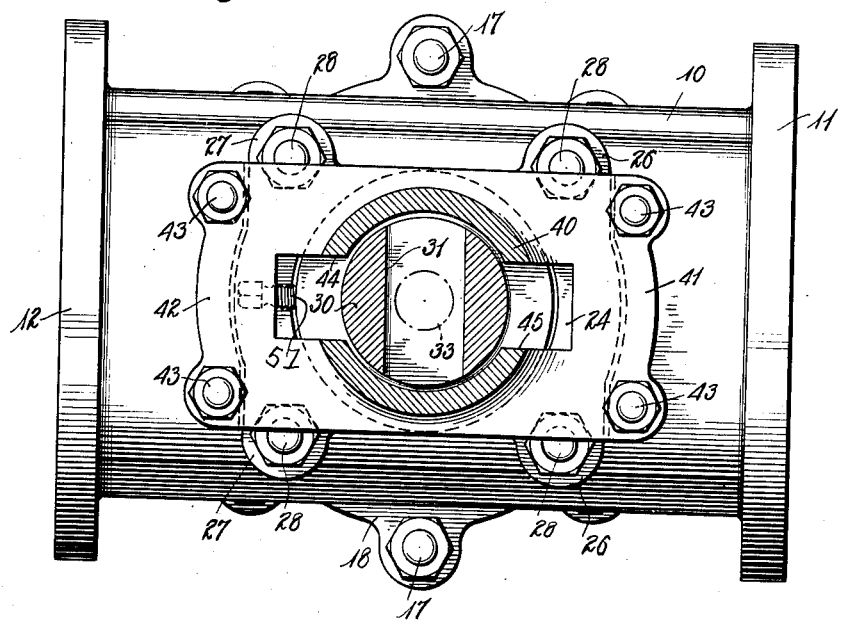
Figure 4 is a detail section on line 4, 4 of Fig. 1.

Within the body 10 there is shown housed a tapered plug 13, having a port 14, therethrough, which, when turned in alinement with the pipes connecting the flanges 11 and 12 permit liquid to flow therethrough, and when turned in the direction shown in Fig. 1 closes the passage-way therethrough.

For the insertion of the plug 13, the lower portion of the body 10 is provided with an opening, being a continuation of the tapered seat 15 into which the plug 13 fits.

To close the lower open end of the body 10, there is shown a cover plate 16 secured to the body 10 by means of bolts 17 passed through the cover plate 16 and through holes in a flange 18 carried by the body 10.

To urge the plug 10 toward its seat a spring 19 is provided, shown in the nature of a concaved disk of spring metal seating upon a shoulder 20 formed upon the cover plate 16.

The body 18 is shown as formed with a recess at 21 for reception of a joint ring 22, and the plug 13 is shown as formed with a shoulder 23 against which the ring 22 impinges. To compress the ring 22, there is shown a collar 24 having a portion 25 of annular extent substantially the same as the ring 22, which collar is formed with projecting flanges 26, 27 having holes engaged by bolts 28, which bolts also pass through the openings in a flange 29 upon the body of the valve casing. By tightening the nuts upon the bolts 28 the ring 22 may be compressed, and if compressed sufficiently by this means the plug 13 may be forced slightly away from its seat, or with a less compression the pressure of the plug 13 upon its seat may be adjusted.

Figure 5:
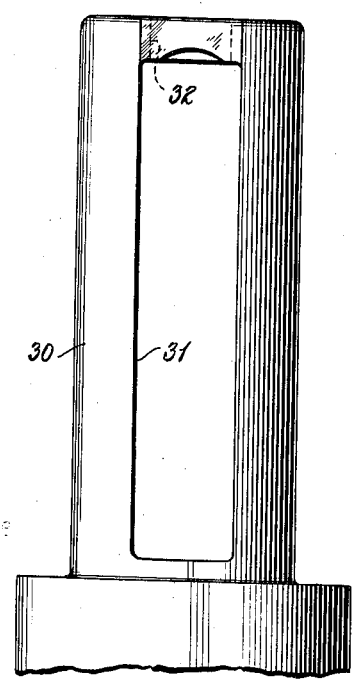
Figure 5 is a detail elevation of the valve spindle.
Figure 6:
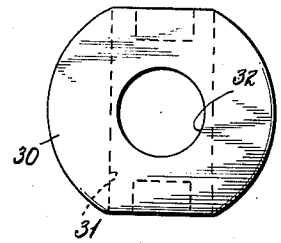
Figure 6 is a plan view of the spindle shown in Figure 5.
Figure 7:
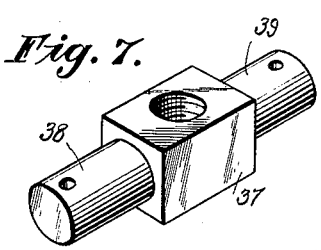
Figure 7 is a perspective view of the nut utilized as a lever for turning the valve plug.

To exert turning movement upon the plug 13, the same is shown as extended into a spindle 30 provided with a longitudinal slot 31, more clearly shown in Fig. 5. The top of the spindle 30 is formed with an opening 32 through which a screw 33 extends, carrying a hand wheel 34 secured upon a tapered portion 35 by means of a nut 36.

To cause turning movement of the spindle a nut 37 threaded to receive the screw 33 is adapted to travel in the slot 31. Projecting from opposite ends of the nuts 37 there are shown studs 38, 39. To coact with the studs 38, 39 a sleeve 40 is shown mounted to bridge the ring 24 and having bolt flanges 41, 42 at its lower end, shown as secured to the flange 29 by means of bolts 43.

To coact with the studs 38, 39 there are shown spiral grooves in the sleeve 40, at 44, 45, extending from the base to a position adjacent the upper end of the sleeve and having a progression of 90°. Preferably these slots are formed upon a true spiral.

To reduce friction between the studs 38, 39 and the edges of the cam slots 44, 45, rollers 46, 47 are shown mounted upon the studs, and to reduce friction between the nut 37 of the studs 38, 39 other rollers 48, 49 are shown upon the studs in a position to coact with the outer portion of the slot 31.

The diameter of the rollers 48, 49 is slightly greater than the thickness of the nut 37, so that the rollers will impinge against the walls of the slot 31, and this engagement will be adjacent the outer edges of the slot where the greatest leverage will be secured.

Preferably the rollers 48, 49 are formed with the slightly reduced portion 50, so as to keep the active portion of the rollers 48, 49 spaced away from the active portion of the rollers 46, 47.

When the valve is in a closed position and the hand wheel 34 is revolved, thereby drawing the nut 37 longitudinally thereof and longitudinally in the slot 31, the action of the cam slots 44, 45 will result in a revolution of the nut 37 about the axis of the screw, carrying with it the plug of the valve with a smooth and easy motion.

The leverage secured by the mechanical movement disclosed is the equivalent of a straight lever many feet in length, and by this form of movement it is made possible to operate a tapered plug to coact with pipes of six inches or greater diameter.

The material of which the cock is made will depend upon the service for which it is designed. In positions where rust is probable, it may be made of non-rust material, such as bronze. In other situations, cast iron and bronze may be used for different portions of the valve, or the same may be made entirely of cast iron, without departing from the principles of the invention. Also, the material of which the packing ring is made will be such as is suited for the service for which the cock is intended, but should be of a relatively compressible nature. As described, the ring may be utilized to slightly separate the plug from its seat, or to relieve the friction therebetween, especially when the plug may have become slightly corroded to the seat.

Means for lubricating the plug cock are shown in the form of a screw threaded opening in the plug, which is shown as closed by a compressor screw 51. In the bottom of the opening a check valve 52 is shown adapted to yield to allow lubricant to pass into the lubricant passages of the plug and to close against return thereof. A passage 53 communicates with the opening containing the passage 51 and through passages 54, 55 the lubricant is permitted access to grooves 56 so located in the surface of the plug that they will not be exposed to the fluid conduit through the plug during the quarter turn of opening and closing movement of the plug.

With the form shown, the screw 51 may be removed, and the opening filled with grease when the turn of the screw 51 will place pressure upon the grease to force the same into the grooves 56, where the lubricant will be applied to the surface of the valve seat when the valve is operated.

Sufficient pressure if desired may be placed upon the lubricant by means of the compressing means to slightly force the plug 13 from its seat, or to at least relieve the pressure thereof against the seat.

Minor changes may be made in the physical embodiment of the invention without departing from its spirit.

I claim:

1. A valve casing having a tapered valve seat therein, a tapered plug fitting said seat having a port opening therethrough, a spindle extending from one end of said plug through an opening in said casing, a shoulder on said plug, the opening in said casing having a recess opposite said shoulder, a gland ring seated in said recess and against said shoulder, means to compress said ring to provide a tight joint against said plug and to govern the amount of pressure of said plug against its seat, a sleeve surrounding said spindle, a flange extending from said sleeve bridging said gland compressing means and secured to the casing, said spindle having a longitudinal slot and said sleeve having longitudinally arranged spiral cam slots, means traveling in said slots to cause revolution of the plug.

2. A valve casing having a tapered valve seat therein, a tapered plug fitting said seat having a port opening therethrough, means at the respective ends of said plug for maintaining the joint between the plug and its seat, said means at one end comprising a resilient member, and means to cause the same to press the plug to its seat, said means at the opposite end comprising a shoulder on said plug, a recess in said casing opposite said shoulder, a gland ring seated in said recess and against said shoulder, and means to compress said ring, a spindle projecting from one end of said plug and having a longitudinal slot therein, a sleeve surrounding said spindle, a flange extending from said sleeve bridging one of said joint maintaining means and secured to said casing, a longitudinal slot in said sleeve, means traveling in said slots, one of said slots being in the form of a helix having a progression of substantially 90° whereby the travel of said last-named means may cause revolution of the plug.

3. A plug cock comprising, in combination, a plug seat, a revoluble plug fitting said seat and having a port therethrough, a spindle extending from one end of said plug, cam means acting upon said spindle to cause rotation of the plug, said plug having surface lubricant grooves therein so located as to be at all times opposite a portion of the valve seat, means carried by said plug to introduce lubricant under pressure into said grooves.

JESSE C. MARTIN, Jr.